Figure 1:
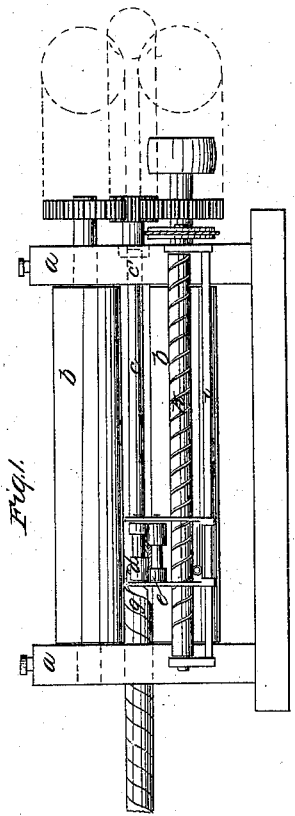
Figure 2:
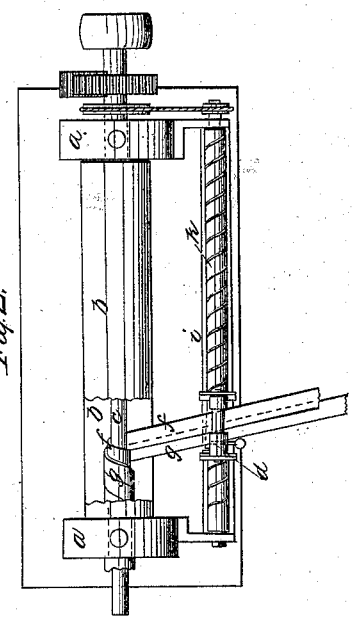
Figure 3:
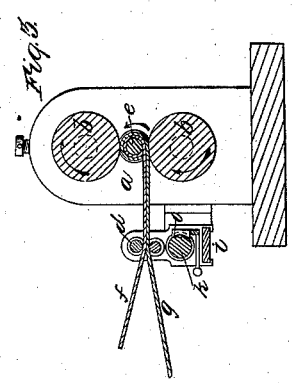

*J. H. Howell,*
*Hose Machine,*

N°. 15,947.                    Patented Oct. 21, 1856.

UNITED STATES PATENT OFFICE.

JACOB H. HOWELL, OF ANSONIA, CONNECTICUT.

MODE OF MAKING INDIA-RUBBER HOSE.

Specification of Letters Patent No. 15,947, dated October 21, 1856.

*To all whom it may concern:*

Be it known that I, JACOB HENRY HOWELL, of Ansonia, county of New Haven, and State of Connecticut, have invented certain new and useful Improvements in Machinery for Making India-Rubber or other Similar Hose; and I do hereby declare that the following is a full, clear, and exact description of the same, reference being made to the annexed drawing, making a part of this specification, in which—

Figure I is a side view or elevation of my machine. Fig. II is a top view. Fig. III is a transverse vertical section, and similar letters indicate similar parts throughout.

My improvement consists in a method of making vulcanized hose of any required diameter, from strips or fillets of india rubber, by which method I am enabled to produce a very superior tube and of any required length.

I construct the hose by winding a strip of the india rubber, prepared as usual for making hose pipes, spirally around a mandrel of the desired size for the bore, and in such manner that the cut edges of the material shall come together. By keeping at the same time a constant pressure upon the rubber those edges will be made to adhere. A second fillet of similar character is then to be wound over the first, care being taken to place it so as to break or cover the line of joining of the edges of the first strip. The pressure is applied also to this, and its edges will thereby be not only caused to adhere, but its inner surface will become attached to the surface of the strip first put on. If still greater strength is desired a third and fourth fillet may be added, care being taken that each successive strip covers the line of joining of that below it. The hose is then to be cured by heat in the usual manner, but when constructed in this way it has no tendency to flatten, and does not therefore require to be put on a rod in that process. It is also of far greater strength and durability than that made by the usual method of rolling up a strip in a direction parallel to its edge, whereby also the length of the hose is limited to that which can be put on a rod and cured thereon in the usual oven.

The machinery by which I effect the making of hose of the aforesaid description is thus constructed: Upon a suitable frame, as at (*a*), I place two similar rollers (*b*) at such distance apart as will admit the mandrel (*c*) with the coatings of rubber upon it, between them. These rollers may be made adjustable, to suit different sized hose, by set screws or otherwise as desired. The mandrel (*c*) is of the diameter intended for the bore of the hose and at one end rests as a journal in the frame, as seen in dotted lines at (*c'*) Fig. I. At the other end the opening through the upright of the frame is large enough to permit the hose to pass through, and the mandrel extends to a short distance beyond the frame, as seen in Fig. 11. One of the rollers is driven by a belt; the other is geared to it, as shown, in such way that both rotate in the same direction, and the mandrel has no rotary motion except such as is imparted to it by the pressure of the rollers upon the surface of the rubber. That motion will of course be in the reverse direction to the motion of the rollers, and as indicated by the arrows in Fig. III. The fillets are applied at the same time and directed on to the mandrel by a pair of guide-rollers, (*d*) and (*e*), placed a little in front of the mandrel as shown. It will be necessary that the fillet forming the first layer should go on to the mandrel first, and it is therefore fed a little in advance of the other. For this reason each of the guide rollers has a portion of its surface cut away to a depth equal to the thickness of the fillet, and this is so placed on each roller that the fillet which is to go on first overlaps the other one half its width, as shown in Figs. I and II, whereby the upper one (*f*) will be rolled directly upon the mandrel, and the lower one (*g*) upon that, but so as to cover the joining place, the pressure being from both the large rollers against the mandrel. As the work progresses it will be necessary that the guide rollers shall move onward so as to preserve their relative position to the end of the hose which is being laid, and they are therefore mounted on a carriage which may be moved along the bar (*i*). This movement is effected by a cylinder (*k*) placed over the bar and having a groove cut spirally around it, in which rides a clutch (*o*) affixed to the carriage. The cylinder thus acts simply as a conveyer, and having a positive motion from the shaft of one of the rollers (*b*) its speed is to be so arranged with reference to that of the mandrel as to keep the fillets presented at the proper angle to be rolled spirally upon it.

The operation will be as follows: The rubber, being properly prepared and cut into strips of uniform width, two of these are placed in the guide-rollers and a short piece of the hose is made by rolling those fillets by hand, in the positions above set forth, upon that end of the mandrel which is to project through the frame. The mandrel is then placed in position, the piece of hose just made on it being in the circular hole left in the upright, as before described, and thus forming a bearing for that end. The rollers (b) are then set to give the proper pressure. Power being now applied to turn the rollers (b) the pressure of those against the surface of the piece of hose on the mandrel will cause that to revolve, winding upon it the fillets in the manner shown in Fig. II, wherein the upper roller is represented as partly broken out to exhibit the manner of laying the fillets. As this winding goes on the pressure is applied to all parts of the surface successively, causing the cut edges as well as the sides of the fillets to adhere. The carriage containing the guide-rollers is started sufficiently in advance of the finished hose to feed the strips at a proper angle to be correctly rolled upon the mandrel in spiral form. When the work has progressed to the limit of the length of the machine, it is to be stopped, the clutch (o) withdrawn from the groove of the conveying cylinder, and the carriage, together with the mandrel and the hose upon it, moved back to the first end. The hose will now extend out of the frame and is to be supported in any manner which will permit it to be continuously rolled as the succeeding portions are made. The mandrel being withdrawn is returned to its first position (c'), and the work may then go on as before. With some preparations of rubber it will be necessary for an attendant to keep those surfaces of the fillets which are to adhere moistened with a solvent or a varnish, and it may also be necessary to use some material to prevent the rubber from sticking to or closing so tightly upon the mandrel that it cannot be withdrawn. For this purpose I have found that pulverized soap-stone rubbed upon it is generally efficacious. The hose is afterward to be cured by heat in the usual manner.

It is obvious that many changes of form may be made in this machine without varying the principle of action, as for instance, the guide rollers for feeding may be mounted in a fixed position and the mandrel with the hose upon it made to move along as fast as the fillets have been laid upon it. In this case the rollers (b) would not necessarily be any longer than merely to operate upon the portion just laid. A single roller may also be employed in combination with the mandrel, if that be made strong enough, since when two or more are used the pressure on the rubber is really between each one of them and the mandrel, the others serving to keep it in place as well as to continue the pressure more constantly until the rubber has become fixed or set. A third or fourth fillet may be added if desired, the number of the guide-rollers in the carriage being merely increased accordingly.

I claim—

The herein described method of constructing india rubber hose, that is to say, by winding a fillet spirally upon a mandrel and upon this winding a second which shall cover or break the line of joining of the first; the said fillets being made to adhere along their cut edges as well as to each other, substantially as set forth.

JACOB H. HOWELL.

Witnesses:
 JOSEPH P. PINSSON,
 S. H. MAYNARD.